(12) United States Patent  
Snow

(10) Patent No.: US 6,729,211 B1
(45) Date of Patent: May 4, 2004

(54) BALL SOCKET DRIVER BIT

(75) Inventor: Jeffrey M. Snow, Bloomington, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/314,484

(22) Filed: Dec. 9, 2002

(51) Int. Cl.$^7$ ............................................... B25B 23/00
(52) U.S. Cl. ....................................... 81/177.75; 81/440
(58) Field of Search ................................ 81/177.75, 440, 81/460

(56) References Cited

U.S. PATENT DOCUMENTS

| | | | |
|---|---|---|---|
| 218,278 A | * | 8/1879 | Kimball .................. 464/155 |
| 3,940,946 A | | 3/1976 | Andersen |
| 4,080,079 A | | 3/1978 | Waara |
| 4,246,811 A | | 1/1981 | Bondhus et al. |
| 4,436,005 A | * | 3/1984 | Hanson .................. 81/177.75 |
| 4,824,418 A | | 4/1989 | Taubert |
| 5,251,521 A | | 10/1993 | Burda et al. |
| 5,408,905 A | | 4/1995 | Mikic et al. |
| 6,302,001 B1 | | 10/2001 | Karle |
| 6,347,564 B1 | | 2/2002 | Ciocca |
| 6,397,709 B1 | | 6/2002 | Wall |
| 6,575,062 B2 | * | 6/2003 | Hahn .......................... 81/460 |

OTHER PUBLICATIONS

McMaster–Carr Supply Company Catalog 106 pp. 2484, 2490–2497, 2503.

* cited by examiner

*Primary Examiner*—Joseph J. Hail, III
*Assistant Examiner*—David B. Thomas
(74) *Attorney, Agent, or Firm*—Mark D. Glut

(57) ABSTRACT

A ball socket driver bit that includes a ball portion and a shank portion. The ball portion has a ball portion cross section; the ball portion cross section perpendicular to the bit axis is hexagonal. The shank portion has a cross section smaller than the ball portion, and ag first shank portion end and a second shank portion end. The first shank portion end is axially attached to the ball portion, the second shank portion end is adapted to axially enter a socket head screw. The ball portion is adapted to enter a socket such that when turning the socket the socket head screw can be turned when the socket axis is not axially aligned with the screw axis.

10 Claims, 3 Drawing Sheets

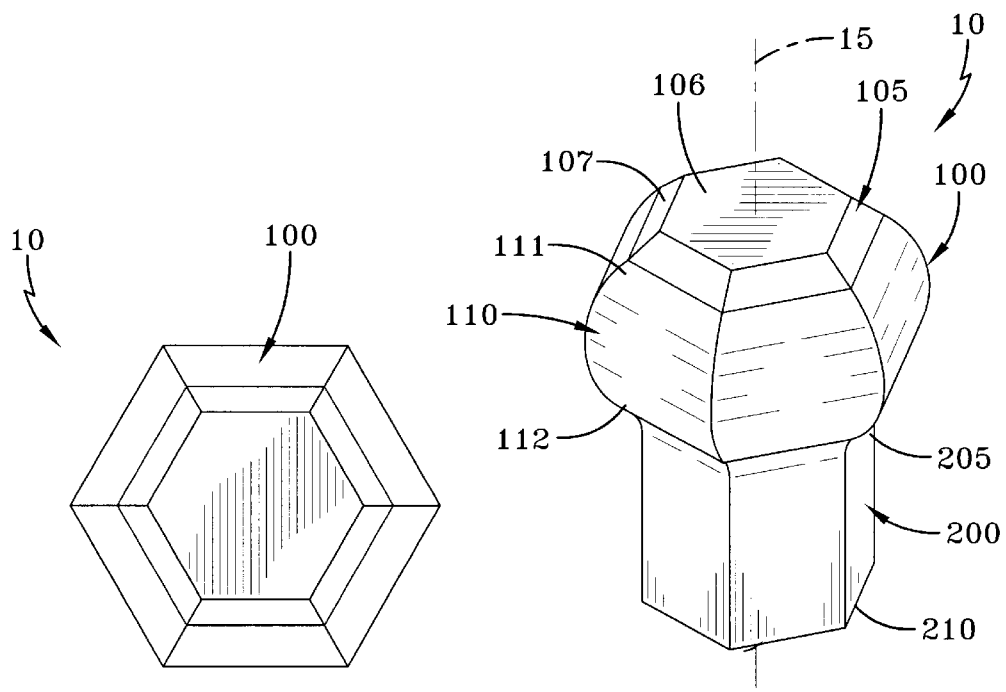
FIG-1
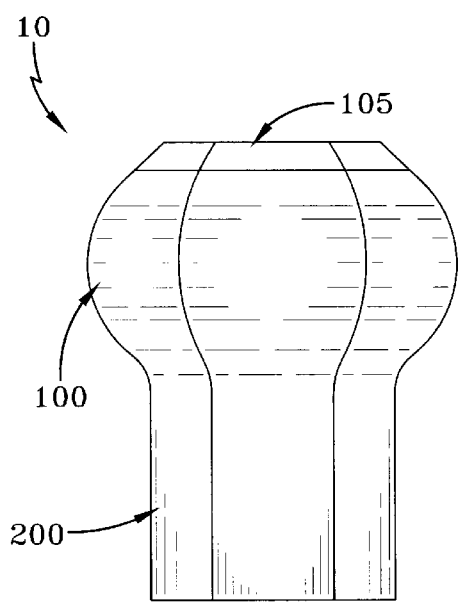
FIG-3
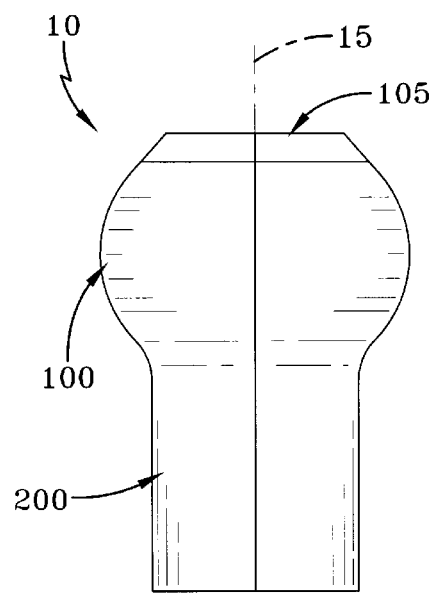
FIG-4
FIG-2

BALL SOCKET DRIVER BIT

STATEMENT OF GOVERNMENT INTEREST

The invention described herein may be manufactured and used by or for the Government of the United States of America for governmental purposes without payment of any royalties thereon or therefor.

BACKGROUND

The present invention relates to tools that are used to turn fasteners. More specifically, but without limitation, the present invention relates to a ball socket driver bit for turning or driving socket screws.

A socket screw is a type of screw that typically requires a hex key or bit to tighten or loosen. A hex key typically extends straight from the socket, and has a bent portion. The key must have sufficient room to rotate the bent portion of the key so that the screw can be continuously turned. If there is insufficient room to rotate the key a full turn, then partial turns are done. This requires repeatedly inserting the key, partly rotating the screw, and removing the key. Accordingly, significantly more time is required to fully insert or remove a screw. Typically ball ended or ball-point hex keys or bits are used to solve this problem and are also made to allow the keys to drive the screw when the key is up to 25 degrees from alignment with the screw axis. Examples of these type of keys or bits are found in U.S. Pat. Nos. 4,246,811, 5,251,521 and 5,408,905. These type of keys or bits typically cannot effectively turn screws when the alignment with the key and screw axis is greater than 25 degrees.

In today's complex machinery, many screws cannot be easily reached with a standard hex key or bit. Often the machinery needs to be taken apart in order to be able to access the screw, especially if the angle between the key or bit axis and screw axis is greater than 25 degrees. Taking apart machinery may take significant time and bring about added expense. Therefore, an apparatus or system that can turn a screw in such a situation without taking apart the machinery is needed.

In addition, ball ended or ball-point keys (such as the ones described in U.S. Pat. Nos. 4,246,811, 5,251,521, 5,408,905 and 6,302,001) have a necked down portion or reduced diameter neck. This necked down portion weakens the key and limits the torque that can be applied. Accordingly, in certain key-screw configurations the keys may break when applying the required torque to turn the screw.

A hex key is often used to place a screw into a threaded hole, especially if the screw is small. A screw put on the end of a hex key will stay on until the screw is near vertical and pointing down. A screw put on the ball end of a ball ended hex key does not stay on as well nor is the screw's orientation controlled as well. Therefore, an apparatus or system is needed which combines the versatility of a ball ended key and the stability of a typical hex key.

For the foregoing reasons, there is a need for a ball socket driver bit.

SUMMARY

The instant invention is directed to a ball socket driver bit that satisfies the needs enumerated above and below.

The present invention is directed to a ball socket driver bit that is comprised of a ball portion and a shank portion. The ball portion has a ball portion cross section; the ball portion cross section perpendicular to the bit axis is hexagonal. The shank portion has a cross section smaller than the ball portion, and a first shank portion end and a second shank portion end. The first shank portion end is axially attached to the ball portion, the second shank portion end is adapted to axially enter a socket head screw. The ball portion is adapted to enter a socket such that when turning the socket the socket head screw can be turned when the socket axis is not axially aligned with the screw axis.

It is an object of the invention to provide a ball socket driver bit such that socket screws can be continuously turned when the alignment with the bit and screw axis is greater than 25 degrees.

It is an object of the invention to provide a ball socket driver bit such that greater torque may be applied than on a typical ball ended or ball-point hex key or bit.

It is an object of the invention to provide a ball socket driver bit that is inexpensive and easy to manufacture.

It is an object of the invention to provide a ball socket driver bit that can be used with standard and common drive tools.

It is an object of the invention to provide a ball socket driver bit that allows access to screws that cannot be accessed with standard tools or keys because they are in hard to reach areas.

It is an object of the invention to provide a ball socket driver bit that retains and orients screws to assist in their placement into holes.

It is an object of the invention to provide a ball socket driver bit that combines the versatility of a ball ended key and the stability of a typical hex key.

DRAWINGS

These and other features, aspects and advantages of the present invention will become better understood with reference to the following description and appended claims, and accompanying drawings wherein:

FIG. 1 is a perspective view of the ball socket driver bit;

FIG. 2 is a top view of the ball socket driver bit;

FIG. 3 is a side view of the ball socket driver bit;

FIG. 4 is an edge view of the ball socket driver bit;

DESCRIPTION

Figure 5:
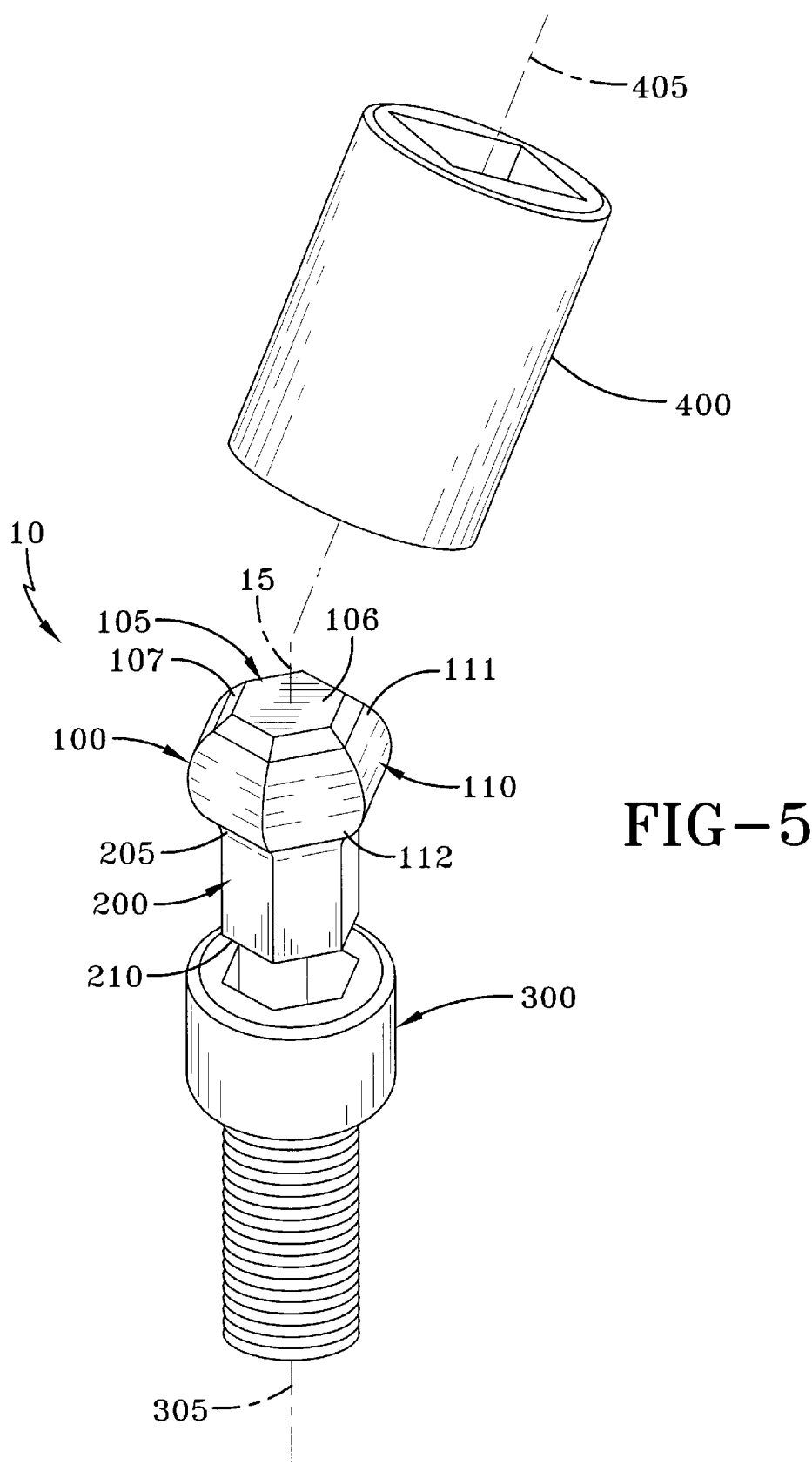
FIG. 5 is an exploded perspective view of the ball socket driver bit in use.
Figure 6:
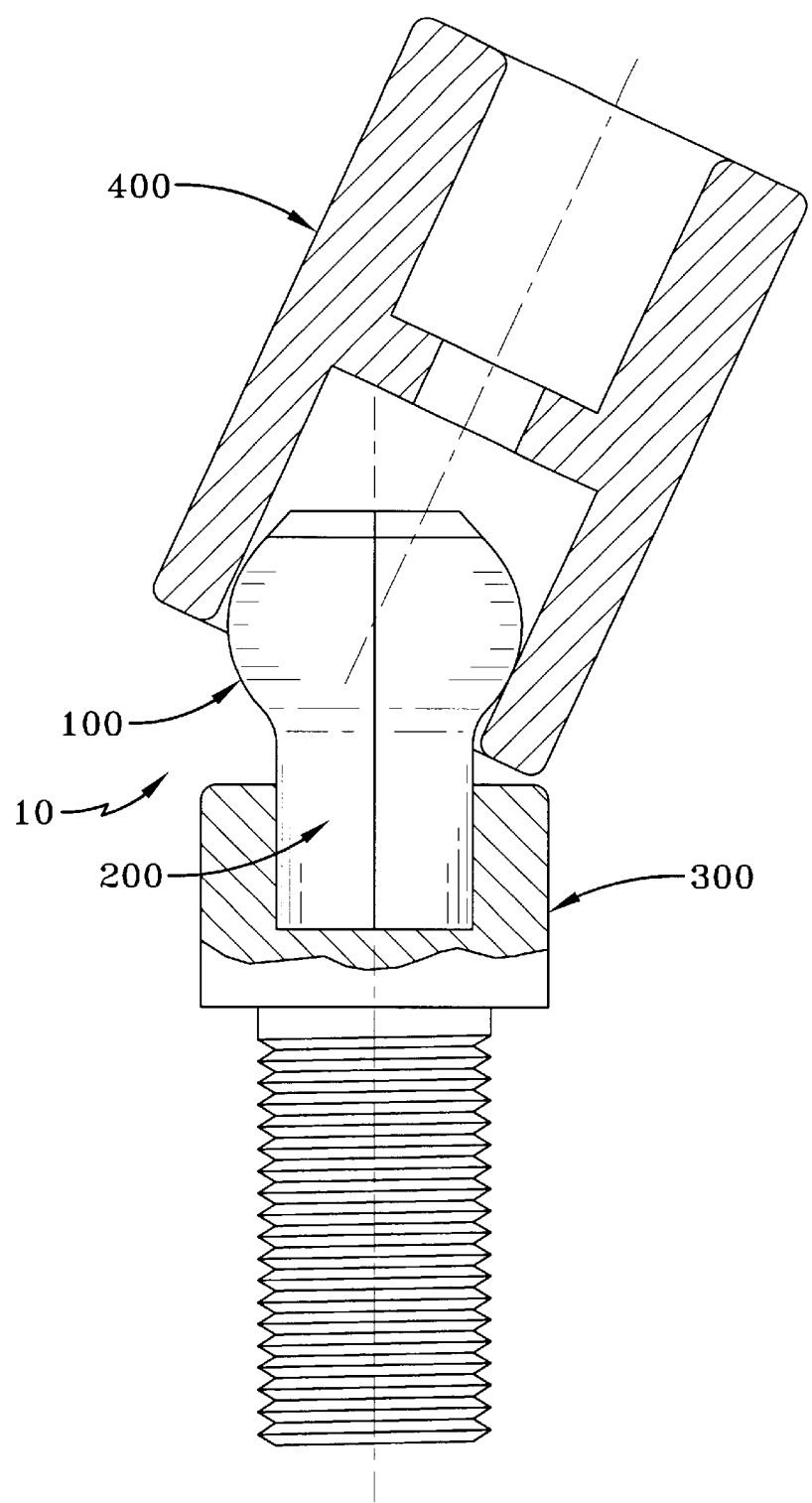
FIG. 6 is a side view of the ball socket driver bit in use.

The preferred embodiment of the present invention is illustrated by way of example below and in FIGS. 1–6. As seen in FIGS. 1–4, the ball socket driver bit 10 has a ball portion 100 and a shank portion 200. The ball portion 100 may have a width or cross section greater than the shank portion 200 width or cross section. The shank portion 200 may have a first shank portion end 205 and a second shank portion end 210. As seen in FIG. 1–6, the first shank portion end 205 is axially aligned to the ball portion 100 and is attached to the ball portion 100. To be axially aligned the axes of the objects are aligned such that it appears that all the axes continue as one straight axis. As seen in FIGS. 5 and 6, the second shank portion end 210 is adapted to axially enter a socket head screw 300 and be able to turn the socket head screw 300. The cross section of the shank portion 200 may be polygonal or whatever shape corresponds to the socket head screw 300. For instance, but without limitation, the cross section may correspond to a Torx, a star, a two pin, a square, a spline, a cross recess (Phillips), a tri-wing, a socket, or combination type screw. The preferred cross section of the shank portion 200 is hexagonal or in the shape of a hexagon, specifically an equilateral hexagon. A hexagon is typically defined, but without limitation, as a polygon having six angles and six sides.

The ball portion 100 may have a flattened cap 105 and rounded ball portion body 110. The flattened cap 105 and rounded ball portion body 110 may be axially aligned. The flattened cap 105 may have a flattened cap top 106 and flattened cap side portion 107. The rounded ball portion body 110 may have a first rounded ball portion body end 111 and a second rounded ball portion body end 112.

The flattened cap top 106 may be substantially flat, while the flattened cap side portion 107 is beveled or outwardly slopes from the flattened cap top 106 to the first rounded ball portion body end 111. The second rounded ball portion body end 112 may be axially attached to the first shank portion end 205.

As seen in FIGS. 1–6, the rounded ball portion body 110 (and its outer surface) may begin to slope declivitously or downward and outward from the flattened cap 105 and at a terminal point begins to slope incurvately, involutely, or downward and inward toward the shank portion 200, specifically toward the first shank portion end 205. The outer surface of the rounded ball portion body 110 may be arcuated and/or curvilinear. The preferred shape of the rounded ball portion body 110 is primarily spherical in shape with the cross section perpendicular to the ball socket driver bit axis 15 hexagonal.

FIGS. 5 and 6 show the ball socket driver bit 10 in use. The ball portion 100 is adapted to enter a socket 400 such that when turning the socket 400 while the shank portion 200 has entered the socket head screw 300, the screw 300 can be turned. Typically the ball socket driver bit axis 15 and the screw axis 305 are axially aligned. The socket 400 may mechanically retain the ball socket driver bit 10. The socket 400 may be driven conventionally by, but without limitation, a ratchet, a screw driver, a drill, or any type of driver. The socket axis 405 and the socket head screw axis 305 may be axially aligned or not axially aligned and the screw 300 may be continuously turned. The angle of the socket axis 405 to the socket head screw axis 305 may be greater than 25 degrees, and still the screw 300 may be continuously turned. The ball portion 100 may be magnetized so that the socket 400 preferentially retains the ball socket driver bit 10, and/or the shank portion 200 may be magnetized so that the socket head screw 300 preferentially retains the shank portion 200. In the preferred embodiment, the entire ball socket driver bit 10 is magnetized.

The ball socket driver bit 10 may be solid and manufactured from any material that lends itself to a driver bit. The preferred material is hard, strong, and wear resistant such as steel used in hex keys, sockets, wrenches, or high strength screws. The surface may be treated to provide a hard and wearing surface. The ball portion 100 is subject to sliding type wear and may have a different surface treatment than the shank portion 200. Beryllium-copper may be used for bits that must be non-sparking.

When introducing elements of the present invention or the preferred embodiment(s) thereof, the articles "a," "an," "the," and "said" are intended to mean there are one or more of the elements. The terms "comprising," "including," and "having" are intended to be inclusive and mean that there may be additional elements other than the listed elements.

Although the present invention has been described in considerable detail with reference to certain preferred versions thereof, other versions are possible. Therefore, the spirit and scope of the appended claims should not be limited to the description of the preferred versions contained herein.

What is claimed is:

1. A ball socket driver bit, the ball socket driver bit having a bit axis, the ball socket driver bit comprising:
    (a) a ball portion, the ball portion having a ball portion cross section, the ball portion cross section perpendicular to the bit axis being hexagonal, wherein the ball portion further comprises a flattened cap and a rounded ball portion body, the flattened cap having a side portion, the rounded ball portion body having a first rounded ball portion body end and a second rounded ball portion body end, the flattened cap axially attached to the first rounded ball portion body end, the side portion outwardly sloping toward the first rounded ball portion body end;
    (b) a shank portion, the shank portion having a cross section smaller than the ball portion, the shank portion having a first shank portion end and a second shank portion end, the second rounded ball portion body end axially attached to the first shank portion end, the second shank portion end adapted to axially enter a socket head screw, the socket head screw having a screw axis, the ball portion adapted to enter a socket having a socket axis such that when turning the socket the socket head screw can be turned when the socket axis is not axially aligned with the screw axis.

2. The ball socket driver bit of claim 1, wherein the rounded ball portion begins to slope outwardly from the flattened cap and at a terminal point begins to slope inward toward the shank portion.

3. The ball socket driver bit of claim 2, wherein the shank portion having a cross section that corresponds to a screw selected from the group consisting of a Torx, a star, a two pin, a square, a spline, a cross recess (Phillips), a tri-wing, a socket, hexagonal, or combination type.

4. The ball socket driver bit of claim 3, wherein the ball portion is magnetized.

5. The ball socket driver bit of claim 3, wherein the shank portion is magnetized.

6. The ball socket driver bit of claim 3, wherein the ball socket driver bit is magnetized.

7. A ball socket driver bit, the ball socket driver bit having a bit axis, the ball socket driver bit comprising:
    (a) a ball portion, the ball portion having a ball portion cross section, the ball portion cross section perpendicular to the bit axis being hexagonal, the ball portion comprising a flattened cap and a rounded ball portion body, the flattened cap having a side portion, the rounded ball portion body having a first rounded ball portion body end and a second rounded ball portion body end, the flattened cap axially attached to the first rounded ball portion body end, the side portion outwardly sloping toward the first rounded ball portion body end;
    (b) a shank portion, the shank portion having a hexagonal cross section smaller than the ball portion, the shank portion having a first shank portion end and a second shank portion end, the second rounded ball portion body end axially attached to the first shank portion end, the rounded ball portion begins to slope outwardly from the flattened cap and at a terminal point begins to slope inward toward the shank portion, the second shank portion end adapted to axially enter a socket head screw, the socket head screw having a screw axis, the ball portion adapted to enter a socket with a socket axis such that when turning the socket the socket head screw can be turned when the socket axis is not axially aligned with the screw axis, the ball socket driver bit further being magnetized.

8. The ball socket driver bit of claim 7, wherein the ball socket driver bit is manufactured from steel.

9. The ball socket driver bit of claim 8, wherein the ball socket driver bit is solid.

10. The ball socket driver bit of claim 9, wherein the ball socket driver includes a surface, the surface being treated to provide a hard and wearing surface.

\* \* \* \* \*

UNITED STATES PATENT AND TRADEMARK OFFICE
CERTIFICATE OF CORRECTION

PATENT NO. : 6,729,211 B1
DATED : May 4, 2004
INVENTOR(S) : Jeffrey M. Snow

It is certified that error appears in the above-identified patent and that said Letters Patent is hereby corrected as shown below:

Title page,
Item [74], Attorney, should read -- Mark O. Glut. --
Item [57], ABSTRACT,
Line 5, should read "smaller than the ball portion, and a first shank portion end"

Column 2,
Lines 9-12, should read -- It is an object of the invention to provide a ball socket driver bit such that socket screws can be continiously turned when the alignment with the driver and screw axis is greater than 25 degrees. --

Signed and Sealed this

Third Day of August, 2004

JON W. DUDAS
*Acting Director of the United States Patent and Trademark Office*